(12) United States Patent
Rueb et al.

(10) Patent No.: US 11,828,596 B2
(45) Date of Patent: Nov. 28, 2023

(54) OPTICAL TEMPLATE PROJECTION USING POSITIONAL REFERENCE

(71) Applicant: VIRTEK VISION INTERNATIONAL INC., Waterloo (CA)

(72) Inventors: Kurt D. Rueb, Kitchener (CA); Jeff Erbrecht, Waterloo (CA); Marc Cameron, Waterloo (CA); Elizabeth McAndless, Kitchener (CA)

(73) Assignee: VIRTEK VISION INTERNATIONAL INC, Ontario (CA)

( * ) Notice: Subject to any disclaimer, the term of this patent is extended or adjusted under 35 U.S.C. 154(b) by 0 days.

(21) Appl. No.: 17/734,495

(22) Filed: May 2, 2022

(65) Prior Publication Data

US 2022/0349709 A1 Nov. 3, 2022

Related U.S. Application Data

(60) Provisional application No. 63/330,345, filed on Apr. 13, 2022, provisional application No. 63/183,269, filed on May 3, 2021.

(51) Int. Cl.
*G03B 21/14* (2006.01)
*H04N 9/31* (2006.01)
*G01C 11/14* (2006.01)
*G01C 15/00* (2006.01)

(52) U.S. Cl.
CPC ............ *G01C 11/14* (2013.01); *G01C 15/004* (2013.01); *H04N 9/3161* (2013.01); *H04N 9/3194* (2013.01)

(58) Field of Classification Search
CPC .... G03B 21/147; G03B 21/14; H04N 9/3179; H04N 9/3185; H04N 9/3194; G01C 11/14; G01C 11/18; G01C 15/004; B25H 7/00

See application file for complete search history.

(56) References Cited

U.S. PATENT DOCUMENTS 9,200,899 B2   12/2015  Rueb
2018/0104788 A1*  4/2018  Rueb .................. G02B 26/0825

* cited by examiner

*Primary Examiner* — Ryan D Howard
(74) *Attorney, Agent, or Firm* — Gregory D. DeGrazia; Miller, Canfield, Paddock and Stone (57) ABSTRACT

A system and method for aligning projection of an optical indicia on a surface of a large object is disclosed. A reference is disposed in proximity to the object. The reference includes a plurality of markers spaced at intermittent locations. A projection system projects optical indicia onto the surface of the object. A detection system detects the markers disposed upon the reference and signals an image of the markers to a processor for the processor to register a location of the projection system relative to the reference. The reference is aligned with a feature disposed upon the object enabling registration of the markers to the object. A location of the projection system relative to the object is established enabling the projection system to project the optical indicia onto the object to a predetermined location.

12 Claims, 5 Drawing Sheets

OPTICAL TEMPLATE PROJECTION USING POSITIONAL REFERENCE

PRIOR APPLICATIONS

The present application claims priority to U.S. Provisional Patent Application No. 63/183,269, filed on May 3, 2021, and to U.S. Provisional Patent Application No. 63/330,345, filed on Apr. 13, 2022, the contents of each of which are included in their entirety herein by reference.

TECHNICAL FIELD

The present invention relates generally toward a method for displaying optical templates on large objects. More specifically, the present invention relates toward projecting optical templates on large featureless objects using a unique locating reference.

BACKGROUND

The use of laser projectors for projecting optical templates onto worksurfaces to facilitate accurate assembly processes has occurred for many years. Laser projection is well suited for providing precision and accuracy while directing an operator where to perform an assembly function. The laser projector directs a laser spot to cooperating rotating galvanometer mirrors to trace a desired 3D pattern profile on a worksurface. When tracing with sufficient speed the path will appear as a stable, flicker free image in the form of a template or other assembly aide to guide a component placement task.

Figure 1:
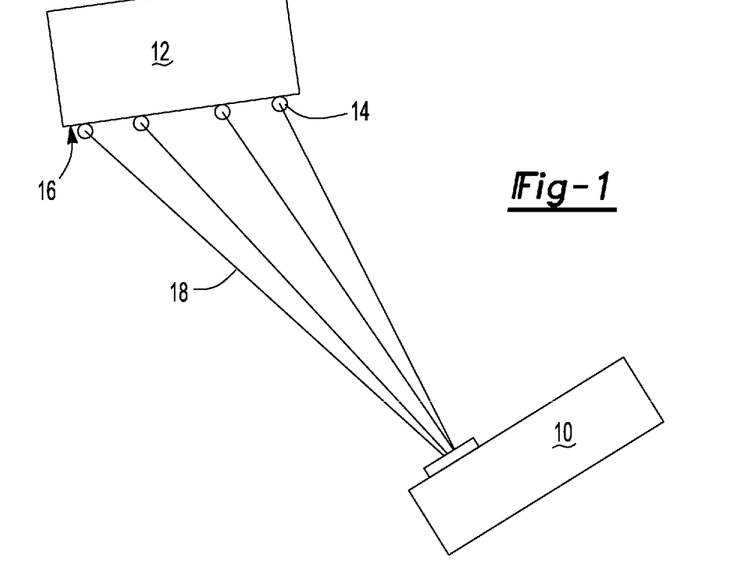
FIG. 1 shows one example of alignment of a prior art laser projector to a small worksurface.

To achieve accurate registration of a laser projector 10 to a workpiece 12, retro-reflective targets 14 are placed upon a worksurface 16 of the workpiece 12 as represented in FIG. 1. The targets 14 are scanned by a laser beam 18 as directed by galvanometer mirrors included in the laser projector 10. The reflected laser beam 18 is detected by a laser sensor from which a three dimensional position is calculated using a mathematical process generally referred to as resection. In this manner, the laser projector 10 is aligned with the worksurface 16 of the workpiece 12 and images in the form of a laser template or pattern maybe accurately projected onto to the worksurface 16.

This technique has proven suitable for applications, such as the manufacturer of composite airplane components. However, this technique has proven problematic for many applications, and particularly so for use on very large objects that extend multiple dozens of meters.

Figure 2:
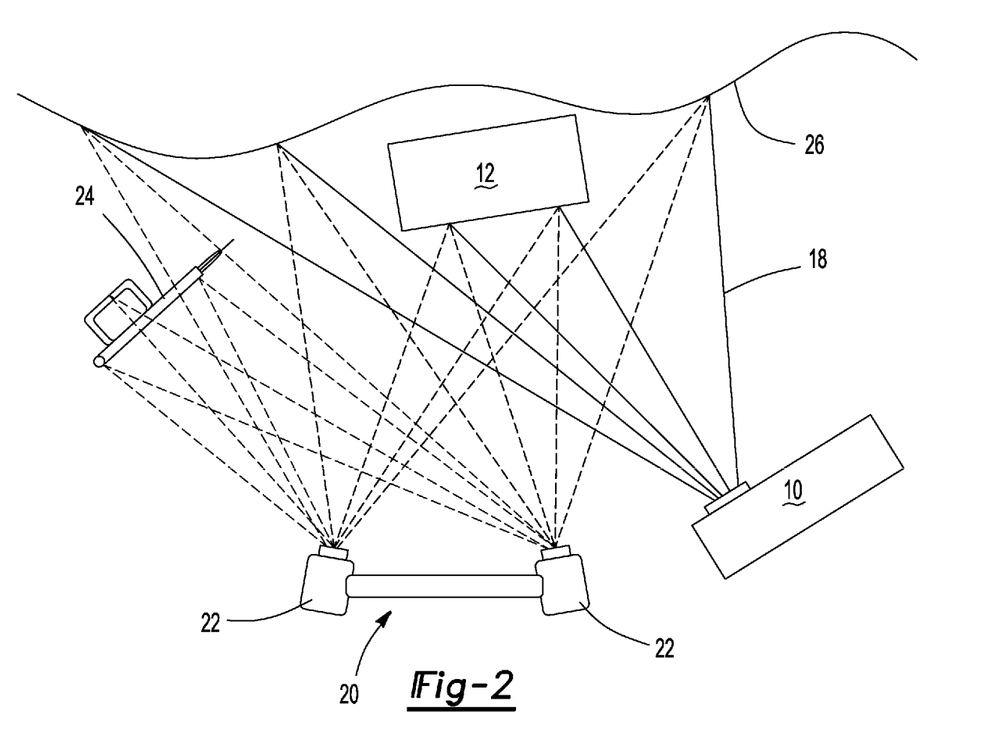
FIG. 2 shows another example of alignment of a prior art laser projector to a small worksurface.

To overcome the limitations of traditional laser template projection systems, camera based photogrammetry has been integrated into the projection system to allow direct measurement of part location relative to the laser projector 10. One such example of a laser projector used for projecting laser templates onto a worksurface is described in U.S. Pat. No. 9,200,899 LASER PROJECTION SYSTEM AND METHOD, the contents of which are included herein by reference in its entirety. This system is shown in FIG. 2 in which a photogrammetry device 20 including one or more cameras 22 is integrated with the laser projector 10. The photogrammetry device 20 is used to measure location of the workpiece 12 by detecting the retro reflective targets 14 placed on the worksurface 16 of the workpiece 12. Alternatively, a handheld probe 24 may be used to locate features on the worksurface 16. Alignment of the laser projector relative to the photogrammetry system 20 is required and determined by measuring the location of the laser patterns projected to arbitrary locations on the worksurface 16 or any other surface 26 within view of the cameras 22. This approach can be further extended by directly measuring locations on the worksurface 16 with the laser beam 18 to allow fully automated location of the projector 10 relative to the worksurface 16.

While these systems have proven quite effective in improving manufacturing efficiencies, they have not been implemented when the worksurface is very large or the space is constrained requiring movement and multiple placements of the laser projector. This limitation is further demonstrated when attempting to use laser projection as an assembly aid when the worksurface is featureless such as, for example, large containers, distillation columns, wind turbine blades, and the like.

Attempts to implement laser projection in these situations have included generating separate location references by placing retroreflective targets throughout the working environment to establish a global reference frame. These targets are measured using photogrammetric surveys that worked cooperatively with the laser projector. However, process of placing targets can be labor intensive and prone to errors when extended over long distances negating efficiencies achieved by projecting laser templates. When used over long distances that approach 100 meters or more, errors in measurement accumulate, particularly when targets are not provided in a stable configuration. Targets requiring temporary placement exasperate these problematic issues rendering laser projection on these large objects impractical. Therefore, it would be desirable to provide a reliable registration of a laser projector with a very large worksurface while maintaining a consistent reference so that the efficiencies achieved by laser projection as an assembly aid may be implemented.

SUMMARY

A system and method for aligning projection of an optical indicia on a surface of a large object is disclosed. A reference is located in proximity to the object. The reference includes a plurality of markers spaced at intermittent locations. A projection system projects optical indicia onto the surface of the object. A detection system detects the markers disposed upon the reference and signals an image of the markers to a processor for the processor to register a location of the projection system relative to the reference. The reference is aligned with a feature disposed upon the object enabling registration of the markers to the object. A location of the projection system relative to the object is established enabling the projection system to project the optical indicia onto the object to a predetermined location.

The system and method of the present invention enables the use of laser projection of indicia, such as a laser template, onto worksurfaces that are very large without the cost associated with indoor metrology devices. The use of a reference such as, for example, a measuring tape including affixed coded targets provides a reference that is aligned with the large worksurface enabling registration of the laser projector with the large worksurface. Even when the worksurface moves relative to the laser projector, or the laser projector is moved out of alignment with the worksurface, reregistration is achievable by way of the coded targets that are affixed to the measuring tape at intermittent locations. Furthermore, large worksurfaces that may require multiple laser projectors to achieve efficiencies are easily coordinated by separate registration of each projector to the reference.

The system of the present application may now be used on large industrial boilers, distillation towers, windmill blades, rocket boosters and any large object that does not necessarily include identifiable features from which registration is achievable. The efficiency of the system of the present application reduces manual templating still required on large featureless objects that sometimes takes several hours to complete to mere minutes.

BRIEF DESCRIPTION OF THE FIGURES

Other advantages of the present invention will be readily appreciated as the same becomes better understood by reference to the following detailed description when considered in connection with the accompanied drawings, wherein.

DETAILED DESCRIPTION

The invention of the present application has overcome problems with accurate projection of laser images onto large featureless surfaces by providing a temporary environmental reference frame. In one embodiment, an actual reference that may span entire length a large featureless object is generally shown at 28 of FIG. 3. In this embodiment, the reference 28 takes the form of a reference 30 that includes reflective targets 32 spaced at intermittent locations. When the reference 30 is a measuring tape, for example, a first target 32a maybe the fix to the measuring tape 30 at a first end, a second target 32b may be affixed to the measuring tape 30 at 10 cm, a third target 32c may be affixed to the measuring tape 30 at 25 cm, a fourth target 32d at 40 cm, and so on. Each of the targets 32a, 32b, 32c, 32d are coded so that each of the targets are distinguishable from the other targets, the purpose of which will be explained further hereinbelow.

Figures 3, 4:
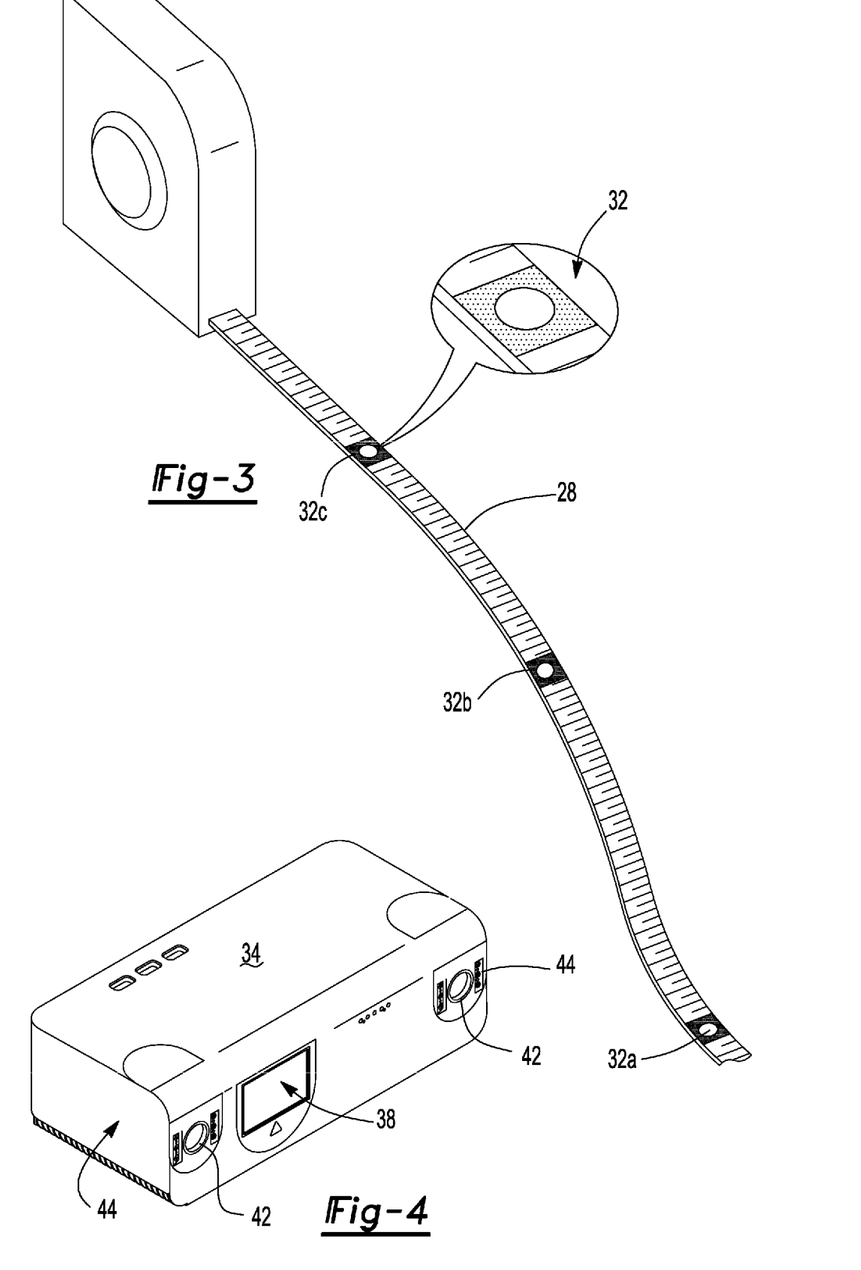
FIG. 3 shows a reference including coded targets.
FIG. 4 shows a laser projector with camera inspection system

The targets 32a, 32b, 32c, 32d are each provided with high contrast features that are distinguishable from the reference 30 and disposed at intermittent locations along the reference 28 at known positions on the reference 30. In this embodiment, the targets 32 are adhesively attached to the measuring tape 30 and include retro-reflective markers. However, it is not entirely necessary that the targets 32 be retro-reflective but may be provided with contrasting patterns distinguishing one target 32 from another.

The unique spacing between each target 32a, 32b, 32c, 32d is selected so that any portion of the reference 28 provides a view of two or more targets 32a, 32b, 32c, 32d to establish an absolute position along the length of the reference 30. In addition, location may be determined toward or away from the start of the reference 28. It has been determined that a simple method of achieving this unique spacing or coding of the targets 32a, 32b, 32c, 32d merely requires selecting spacing between any two targets 32a, 32b, 32c, 32d that is not repeated so long as a necessary tolerance is repeated with the placement of each target 32a, 32b, 32c, 32d. Because the spacing between targets 32a, 32b, 32c, 32d is not repeated, any pair of adjacent targets 32a, 32b, 32c, 32d is indicative as to both the location and direction toward or away from an end of the reference 28. While it is believed that location may be determined from two or more targets 32a, 32b, 32c, 32d that have not been coded based solely on target 32 spacing, encoding each target will likely provide enhanced accuracy.

In one embodiment, the targets 32 are detected by a laser projector 34 scanning the target and a laser sensor 36 detecting laser light 38 reflected by the targets 32a, 32b, 32c, 32d. The LPS-10 laser projector available from Virtek Vision International, Inc is suitable for this function. The sensor 36 detects location of a given target 32a, 32b, 32c, 32d from orientation of scanning mirrors that direct the laser light 38 generated by the laser projector 34 in a known manner. In addition, the sensor signals the location and coding of the target 32a, 32b, 32c, 32d to a processor 40. The processor 40 has been previously programmed with location of each target 32a, 32b, 32c, 32d on the reference 28 so that unique spacing between adjacent of the targets 32a, 32b, 32c, 32d is determined and a location of the laser projector 34 relative to the reference 28 is calculated.

Alternatively, location of the targets 32a, 32b, 32c, 32d may be determined using cameras 42 and flash illumination generated by a secondary light source 44 as best represented in FIG. 4. A VPS1 laser projector provided by Virtek Vision International, Inc is one example of a suitable integrated laser projector and photogrammetry device that enables location identification of individual targets 32a, 32b, 32c, 32d and laser projection of laser images onto a worksurface. This system is explained in U.S. Pat. No. 10,052,734 LASER PROJECTOR WITH FLASH ALIGNMENT AND U.S. Pat. No. 10,239,178 LASER PROJECTOR WITH DYNAMICALLY ADAPTABLE FOCUS, the contents each of which are included herein by reference. The advantage of using flash alignment with a secondary light source 44 and a camera 42 based system is that instantaneous recognition of the target 32 pattern or code and spacing is achievable using a flash of light from the secondary light source 44 that is imaged by the camera 42 and signaled to the processor 40.

Figure 5:
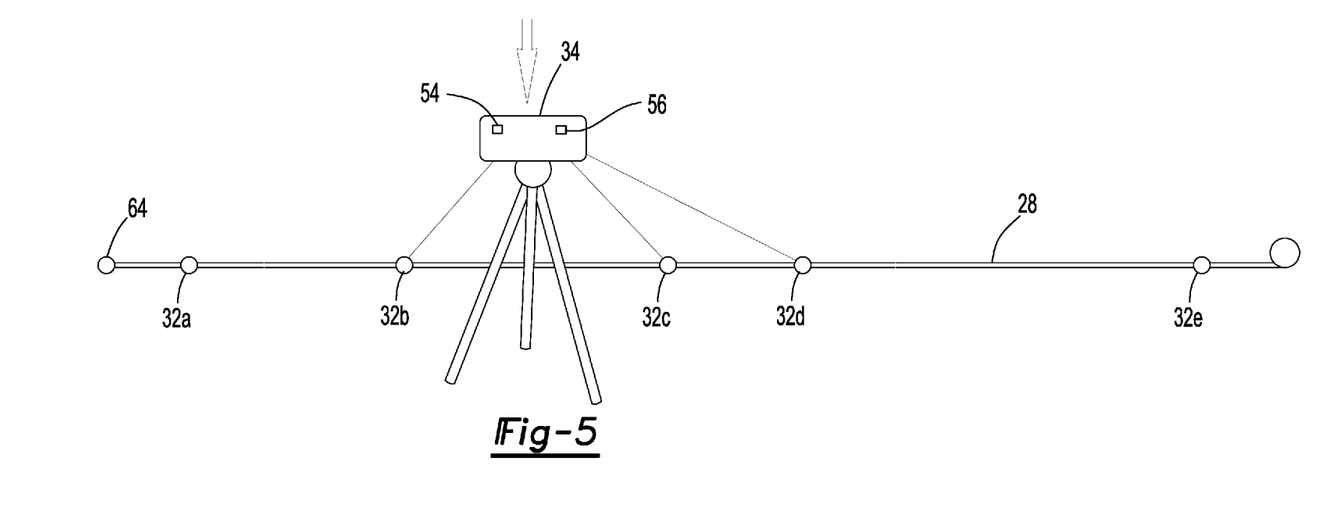
FIG. 5 shows a first embodiment of the system implementing an axial reference of the present invention.
Figure 6:
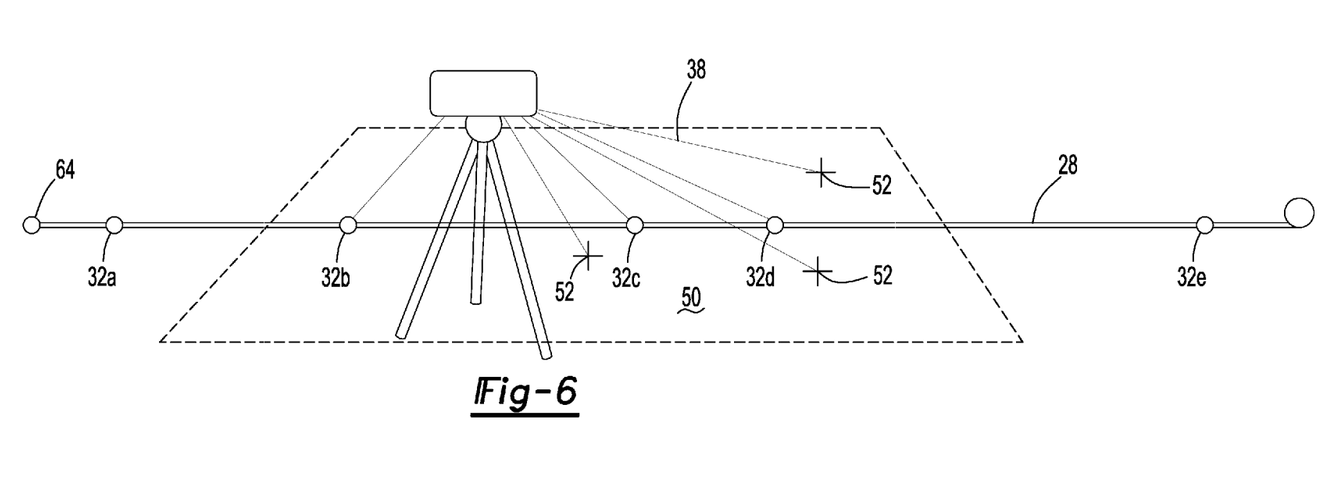
FIG. 6 shows a further embodiment of the system of the present invention.

When the reference 30 is used to identify axial disposition of a large worksurface 46, the measuring tape 30 is stretched along a length of the worksurface 46 as is represented in FIGS. 5 and 6. In this embodiment, once three targets 32a, 32b, 32c, 32d have been identified and located, the distance and relative location to the reference 28 may be determined by the processor 40 that receives target 32a, 32b, 32c, 32d locations and images from reflected light, whether it be laser light 38 generated by the laser projector 34 reflected to the laser sensor 36 or secondary light from the secondary light source 44 detected by the cameras 42. However, rotation of the laser projector 34 in the direction of arrow 46 around the reference 28 when used as an axis is an unknown variable when calculating accurate laser projection of images onto the worksurface 46. Thus, it is desirable to determine rotation about the reference 28 in a direction of rotational arrow 48 to provide accurate location and orientation of the laser projector 34 for projecting accurate laser images onto the worksurface 46.

One embodiment used to determine rotation of the laser projector 34 around the reference 28 is shown in FIG. 5. In this embodiment, the laser projector 34 is capable of measuring surfaces, such as a support surface 50 or floor in the environment. The VPS1 laser projector described above is useful to determine rotation about the reference 28 by projecting, for example, arbitrary laser spots 52 to the surface 50 that are detected by at least one of the sensor 36 and the cameras 42. The processor 40 identifies location and orientation of the surface 50 from the arbitrary laser spots 52 in a known manner. Thus, the processor 40 determines both orientation and location of the laser projector 34 relative to the reference 28.

An alternative solution to the inability of the processor 40 to immediately determine orientation of the laser projector 34 to the reference 28 is also within the scope of this invention. In this embodiment, the laser projector 34 includes an accelerometer 54 and a gyro sensor 56 as shown in FIG. 5. The combination of the accelerometer 54 and the gyro sensor 56 enables the projector 34 to sense changes in orientation relative to gravitational forces. By including these sensors 54, 56, the processor 40 calculates rotation of the laser projector 34 relative to the reference 28 coordinates in a repeatable manner when the reference 28 laid in an axial direction. Therefore, in one embodiment, the distance along the reference 28 (when laid in an axial direction) can be designated to align with an x axis of the environment coordinate reference and a z axis with the orientation of the gravity vector. The defied y axis is obtained from the cross product of the z axis and the x axis. An orthogonal coordinate reference can then be obtained by regenerating the x axis as a cross product of the y axis and the z axis to provide an x axis lying in a level plane established by the reference 28 or conversely adjusting the z axis to be the cross product of the x axis and the y axis. This maintains the original slope of the reference 28 when laid in the axial direction with respect to gravity. In either case, a consistent environmental reference frame is established without requiring additional measurements other than alignment to the targets 32a, 32b, 32c, 32d of the reference 28 when laid in the axial direction relative to the worksurface 46.

Once the environmental reference frame is established by placement of the reference 28 in an axial direction, the location of the large worksurface 46 that otherwise could not be located within the measurement range of a single projector 34, can now be established. By taking local measurements with multiple laser projectors 34, or by repositioning one or more laser projectors 34 to obtain registered measurements at separate locations and integrating them into the environmental coordinate frame established by the reference 28 laid in axial direction the laser projector 34 can immediately be located relative to the reference 28 anywhere in the environmental reference by identifying location of the any of the coded targets 32a, 32b, 32c, 32d affixed to the reference 28.

Measurements of the worksurface 46 can now made using locating features on the worksurface 46 with a manual probe that is tracked by the cameras 42 of the laser projector 34. Alternatively, measurements of the worksurface 46 or boundary features of the object defining the worksurface 46 may be determined using the laser projector 34, cameras 42, or combinations thereof. Once the features have been located, the processor 40 compares location of the feature to computer aided design (CAD) data providing the ability to accurately locate the worksurface 46 within the coordinate system established by the reference 28 enabling accurate projection of laser indicia 47 (see FIG. 9) onto the worksurface 46 to locations established by the CAD data.

Figures 7, 8:
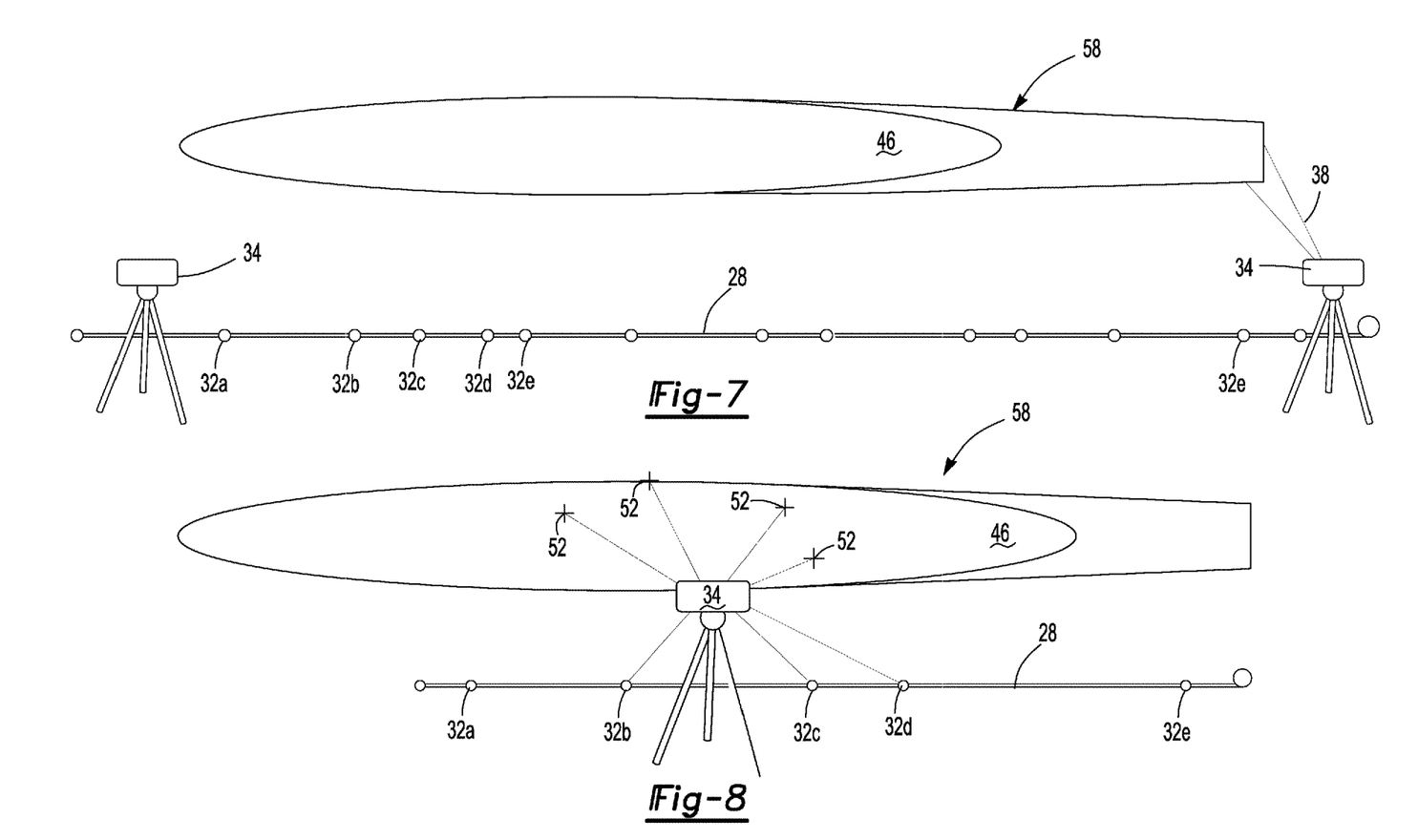
FIG. 7 shows the projection system in use with a windmill blade.
FIG. 8 shows an alternative embodiment of the projection system in use with a windmill blade.

Each feature or reference point used to locate the object is assigned a tolerance according to a specified tolerance scheme. The scheme allows the rough position and measurement to be specified and stored in the CAD or other math model, so that exact placement of the reference 28, or even precise positioning of the object is not required. One example is a turbine blade 58 of a windmill as shown in FIGS. 7 and 8 that would otherwise be nearly impossible to locate because a turbine blade typically runs 100 meters long.

Thus, only rough positioning of the turbine blade 58 or other large object suffices to guide automatic collection of measurements by the laser projector 34 as it is moved along the turbine blade 58 or other large object in order to provide a more precise alignment to adjacent sections of the blade 58. Remarkably, precise measurements and laser projection of laser indicia 47 is achieved without requiring precise placement of any instruments or objects within the coordinates established by the reference 28. Furthermore, accurate projection of optical templates is now possible to assemble components on very large worksurfaces 46 but have no distinguishing characteristics. This is further enhanced by merely identifying end points or edges of the object or turbine blade 58 then locating the endpoint or edges relative to the reference 28 in a manner set forth above.

The system of the present invention is also capable of overcoming environmental inconsistencies that would otherwise cause inaccurate projection of indicia 47 onto the worksurface 46. Under certain conditions, for example, the floor supporting the reference may be uneven, or the sensors 54, 56 in the laser projector 34 may have insufficient accuracy or precision over very long distances. Furthermore, the object, when particularly large, may be deformed from intended CAD criteria further causing inconsistencies in the locating process. Thus, laser projection may be corrected by optimizing the alignment of the laser projector 34 to the reference 28 laid in the axial direction using the position of locally measured features such as the general disposition of the worksurface 46 of the object while precisely constraining the distance along the featureless surface. By using the precise distance measured along the reference 28 laid in the axial direction in conjunction with earlier measurements taken at the reference point or edge of the object inconsistencies in the environment may be overcome. Thus, measuring local features of the object is useful in correcting for any inaccuracy in either the object or the environment such as, for example, sagging or twisting to account for a rough alignment or environmental reference.

Once the large worksurface 46 has been located within a coordinate system, accuracy is maintained by at least one of the laser projector 34 and the camera 42 monitoring for drift due to electronic drift, physical changes or movement of the object or projector. This is achieved by recording any changes in the location of the axially placed targets 32a, 32b, 32c, 32d by scanning the laser beam 18 over the targets 32a, 32b, 32c, 32d and detect reflected light by the laser sensor 36 or the cameras 42 and evaluating new position of the laser projector 34 within the coordinate frame established by the reference 28.

In addition, the accelerometer 54 and the gyro sensor 56 continuously monitor for any physical movement of the laser projector 34 to ensure that measurements of the worksurface 46 are conducted while the laser projector 34 is disposed in a stable position, or to respond instantly to calculate a new position if the laser projector 34 is repositioned for a new view of the worksurface 46. To provide further assistance to an operator moving the laser projector 34, the laser projector projects an image onto the worksurface 46 that identifies a field of view of the cameras 42 so that the operator may select an appropriate placement that is suitable to view both the reference 28 and desired portions of the worksurface 46.

It should be understood that the system of the present invention also provides the ability to use a single laser projector 34 that is moveable along a length of a very long object even exceeding one hundred meters when the reference 28 is oriented in the axial direction. In one embodiment, a plurality of laser projectors 34 are moveable on a cart that includes an individual processor 40. Each processor includes the necessary CAD data so that each projector independently is capable of accurately projecting a laser image onto the work surface 46 without separate data input. Alternatively, each projector 34 communicates with a remote processor 40 or the processors 40 of other laser projectors 34 via Wi-Fi or Bluetooth technology to coordinate projection of the laser images.

Figure 9:
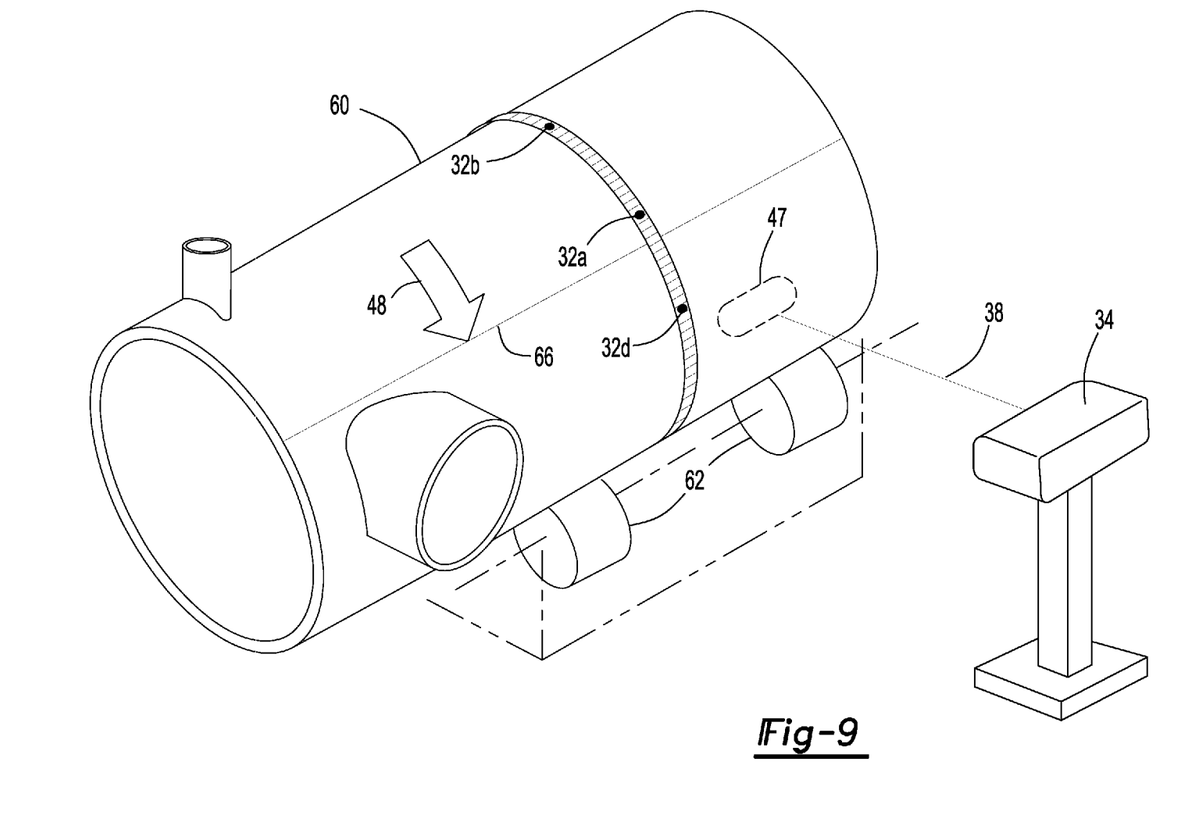
FIG. 9 shows a further alternative embodiment of the projection system implementing a circumferential reference.

A further embodiment of the present invention is shown in FIG. 9 in which the reference 28 is no longer aligned in the axial direction but is used as a circumferential reference. Implementation of the reference 28 in a circumferentially orientation is particularly suited for large containers such as boilers 60 and fluid tanks, distillation columns, and any large object that is likely to pivot either inadvertently or by design during assembly. While a boiler is referenced in this portion of the detailed description, it should be understood that any of these large tubular objects are included within the scope of this invention. When working with a boiler 60, rotation around a longitudinal axis becomes problematic with respect to alignment of the laser projector 34 and the worksurface 46 of the boiler 60.

As represented in FIG. 9, the boiler 60 is supported upon driving wheels 62 use to rotate the boiler 60 for performing assembly tasks. Therefore, alignment of the laser projector 34 with the boiler 60 must be re-registered each time the boiler rotates. As with the first embodiment, a plurality of reflective targets 32a, 32b, 32c, 32d are fixed to a measuring tape 30 at unique or intermittent locations.

When used in this manner, the reference 28 is wrapped circumferentially around the boiler 60. While affixing the measuring tape 30 to the boiler 60, a distal end 64 of the measuring tape 30 is aligned with a reference feature on the container such as, for example, a seem 66 between two adjacent panels for the boiler 60. In this manner, the seam 66 acts as a datum defined in the tolerance scheme as part of the CAD data. The processor 40 registers the distal end 64 of the measuring tape 30 with the seam 66 by correlating the known location of each of the targets 32a, 32b, 32c, 32d affixed to the measuring tape 30. Thus, the processor 40 registers the distal end 64 of the seam 66 within the coordinate system established by the reference 28. By accessing the CAD data, the processor 40 calculates the location of the boiler 60 within the coordinate system established by the reference 28 and signals the laser projector 34 where to project a laser template or other indicia 47 for directing a work activity.

To enhance accuracy, it is preferable to have at least two reflective targets 32a, 32b, 32c, 32d within view of the laser projector 34 and the cameras 42 during alignment. The system periodically measures location of the various targets 32a, 32b, 32c, 32d and recalibrates projection of the laser template so that the laser template is continuously and accurately located for a duration necessary for completing an assembly task.

In a still further embodiment, two or more measuring tapes 30 with coded targets 32a, 32b, 32c, 32d are wrapped around the boiler 60 to achieve additional accuracy or to accommodate very large work surface 46 defined by the boiler 60 when a single measuring tape 30 does not suffice. further, the use of a measuring tape 30 in this manner overcomes alignment deficiencies resulting from assembly of the boiler 60 that is not within specified tolerance of the CAD data. This is particularly important with very large containers that are known to compress when resting sideways on a container wall. This flexing can cause an elliptical wall to temporarily appear during assembly of various components. The measuring tape 30 traces the elliptical shape and the processor 40 accounts for the difference between the CAD and the shape of the actual container to direct the laser projector 34 to accurately project a laser template. Still further, implementing the measuring tape 30 in a circumferentially orientation overcomes deficiencies associated with using merely an axial orientation reducing or eliminating a need for additional sensors required for identifying rotation of the object.

The invention has been described is in an illustrative manner; many modifications and variations of the present invention are possible, including removal of toxins from fluids, in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the stated claims following this first disclosed embodiment.

What is claimed is:

1. A system for aligning projection of an optical indicia on a surface of an object; comprising:
    a processor;
    a reference disposed in proximity to the object, said reference including a plurality of markers spaced at predefined, intermittent locations thereupon;
    a projection system for projecting optical indicia onto the surface of the object;
    a detection system for detecting said markers disposed upon said reference and signaling an image of said markers to said processor for said processor to register a location of said projection system relative to said reference; and
    said reference being registered with a feature disposed upon the object thereby registering each of said markers disposed upon said reference to said object for establishing a location of said projection system relative to the object enabling said projection system to project the optical indicia onto the object to a predetermined location.

2. The system set forth in claim 1, wherein said reference comprises a flexible tape being scaled with said markers being spaced intermittently there along.

3. The system set forth in claim 1, wherein each of said plurality of markers is distinguishable by distinctive coding.

4. The system set forth in claim 3, wherein said reference comprises a tape including a distal end with said distal end being alignable with the feature disposed upon the object for registering each marker to the object.

5. The system set forth in claim 1, wherein said projection system comprises a laser projector.

6. The system set forth in claim 1, wherein said imaging system comprises a photogrammetry system including a camera.

7. The system set forth in claim 1, wherein said laser projector includes a light sensor for detecting light reflected from said markers.

8. The system set forth in claim 1, wherein at least three markers are disposed within a field of view of said imaging system.

9. The system set forth in claim 1, wherein said reference is located to establish axial coordinates of the object.

10. The system set forth in claim 1, wherein said reference is located to establish radial coordinates of the object.

11. The system set forth in claim 1, wherein said projection system includes at least one of an accelerometer and a gyro sensor for establishing radial orientation of said projector to said reference.

12. The system set forth in claim 1, wherein said projection system scans surfaces adjacent said reference for determining orientation of said projector to said reference when said reference defines an axis relative to the object.

* * * * *